Patented July 27, 1926.

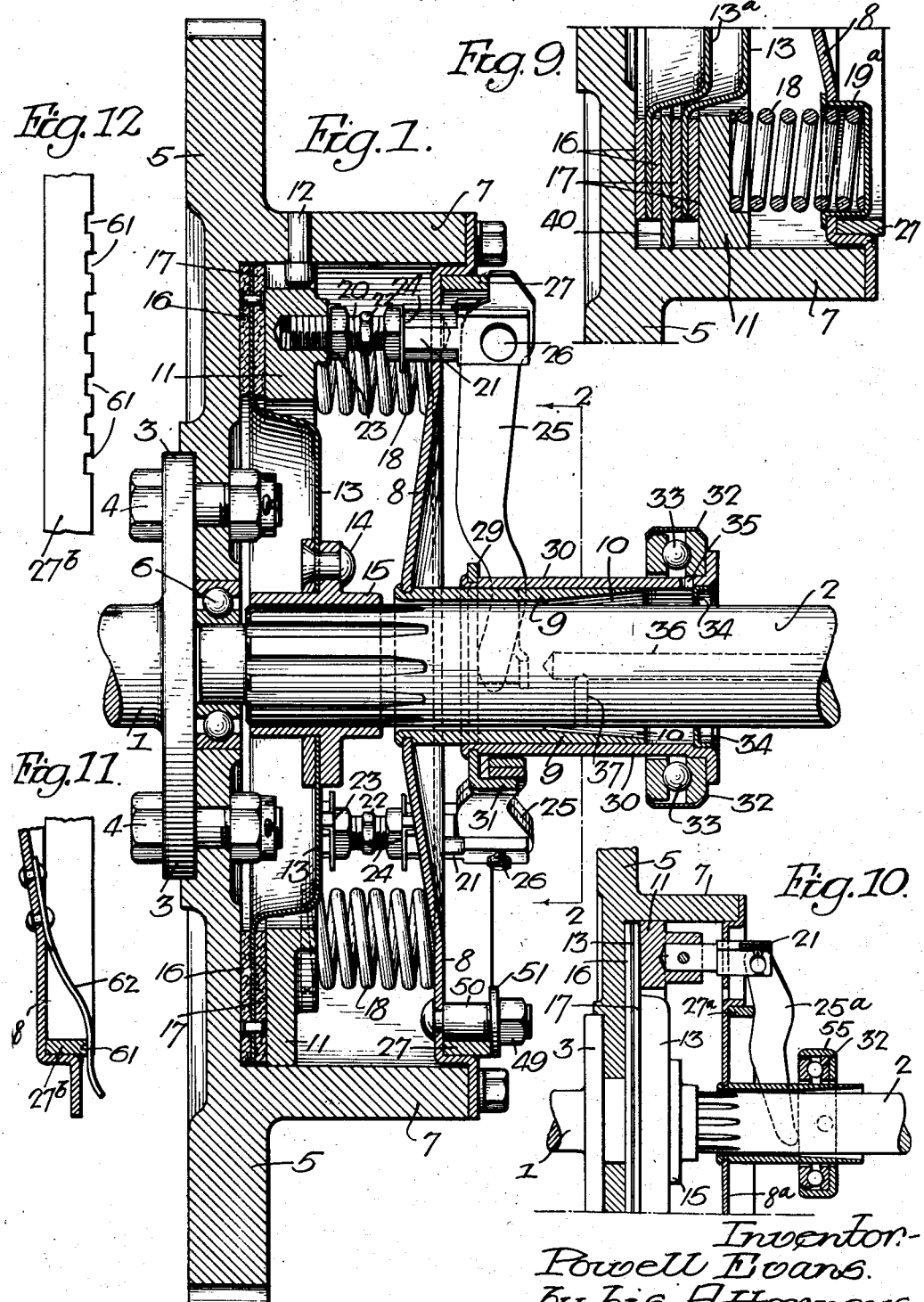

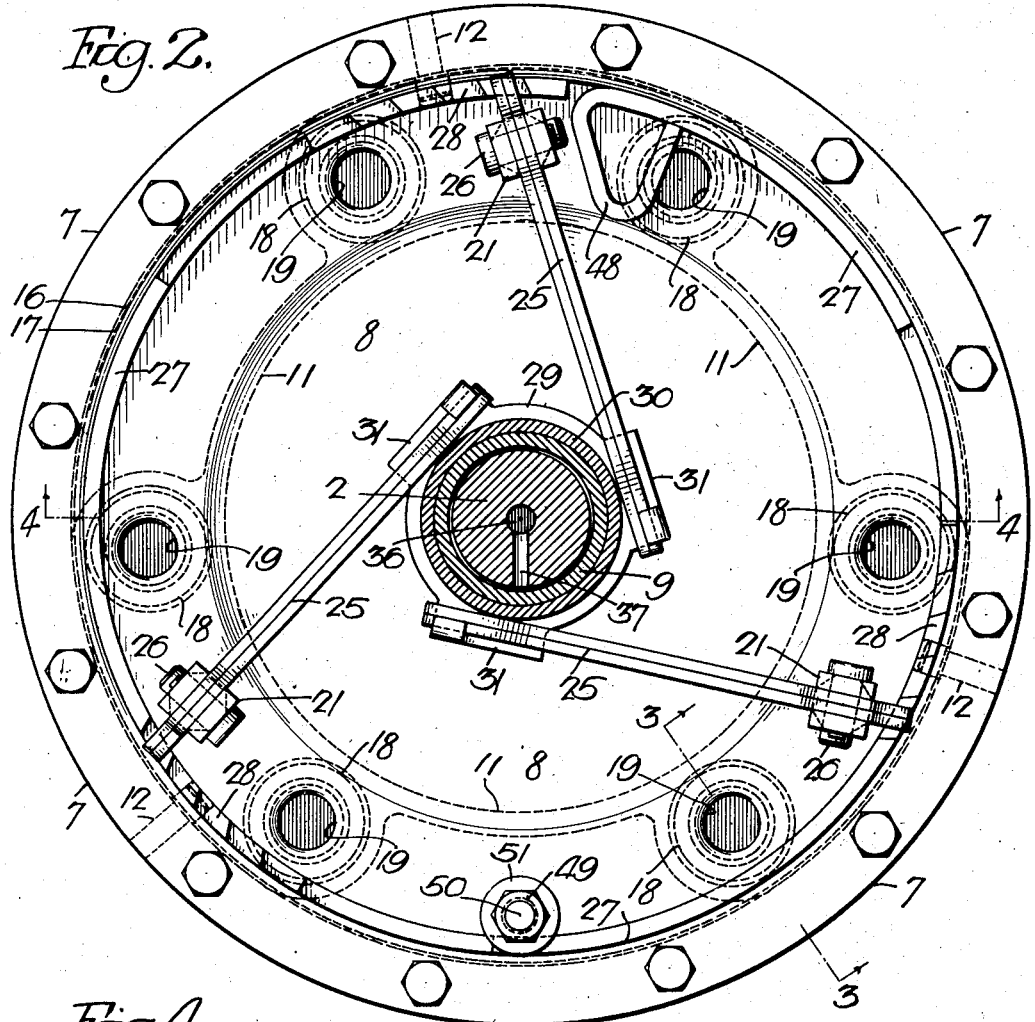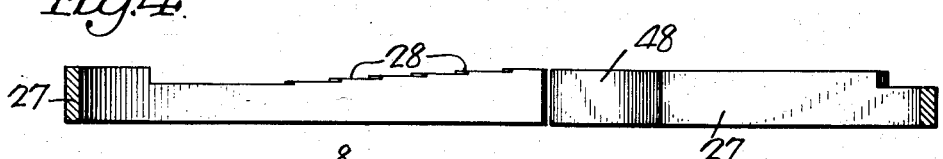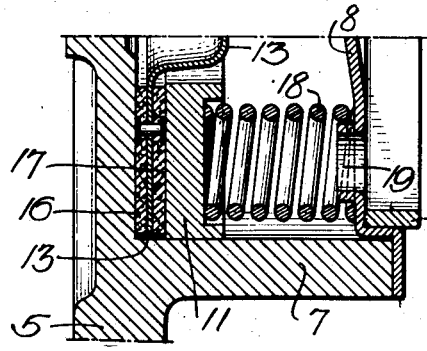

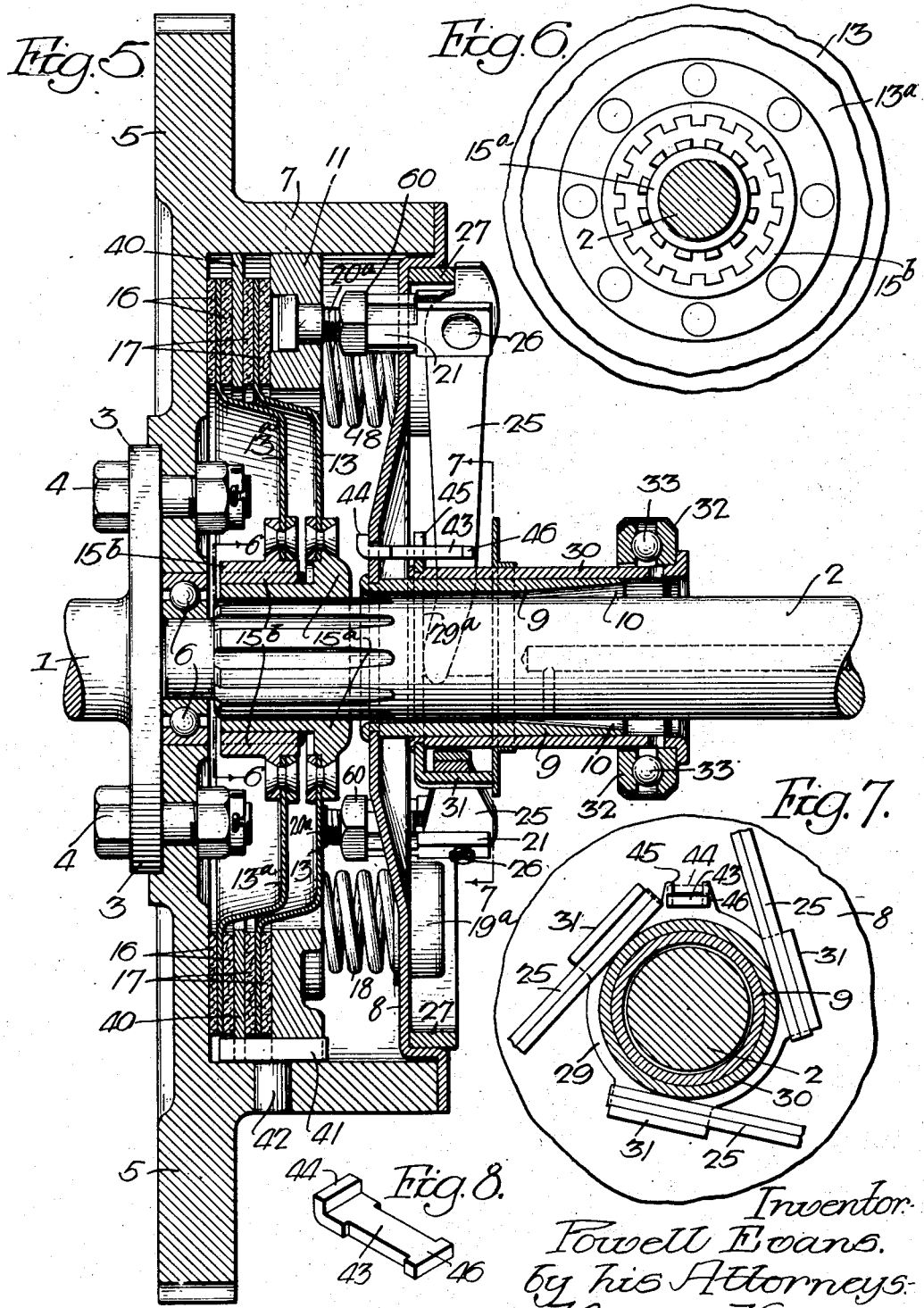

1,594,161

UNITED STATES PATENT OFFICE.

POWELL EVANS, OF PHILADELPHIA, PENNSYLVANIA.

CLUTCH.

Application filed December 15, 1922. Serial No. 607,154.

One object of this invention is to provide a friction clutch with a novel arrangement of parts for insuring the uniform adjustment of the fulcrums of its external controlling levers in order to compensate for wear of the frictionally coacting parts;— the invention also including novel means for connecting said levers with a presser plate in order to permit of the exact and speedy shop assembly of the parts.

A further object of the invention is to provide a clutch of the above type having coacting friction discs mounted in a novel manner to permit of their free relative movement both for compensating for wear and also to insure their complete disengagement in the declutching operation.

Another object of the invention is to provide a friction clutch with a novel construction of cover plate post and associated parts for insuring lubrication of the clutch control bearing, together with novel means for limiting the movement of the clutch-controlling collar relatively to the cover plate in order to prevent the former touching the adjacent transmission structure and at the same time to avoid the necessity for a brake on the shaft.

These objects and other advantageous ends I attain as hereinafter set forth, reference being had to the accompanying drawings, in which:—

Fig. 1 is a longitudinal vertical section of a friction clutch embodying my invention;
Fig. 2 is a transverse vertical section on the line 2—2, Fig. 1;

Fig. 3 is a fragmentary section on the line 3—3, Fig. 2, illustrating the mounting of the actuating springs;
Fig. 4 is a transverse section of the lever-adjusting ring, taken on the line 4—4, Fig. 2;

Fig. 5 is a longitudinal section of a friction clutch similar to that of Figs. 1 and 2, but including a plurality of flexible discs;

Figs. 6 and 7 are transverse sections on the lines 6—6 and 7—7 respectively, Fig. 5;

Fig. 8 is a perspective view of one of the motion-limiting links forming part of my invention;

Fig. 9 is a section similar to Fig. 3, illustrating the modified spring mounting preferably employed in the clutch of Fig. 5;

Fig. 10 is a fragmentary section of a modified arrangement of the actuating levers and their associated parts;

Fig. 11 is a section showing a special construction for retaining the fulcrum ring in any of several adjusted positions; and Fig. 12 is a fragmentary elevation of the ring shown in Fig. 11.

In the above drawings 1 and 2 represent two axially aligned shafts, of which the first has a flange 3 connected by bolts 4 to a fly wheel structure 5. The latter has a centrally mounted bearing 6, in which is rotatably carried the free end of the shaft 2 and in addition said structure 5 is formed with an integral, substantially cylindrical lateral extension 7 which, with a cover plate 8, constitutes a clutch casing. Said cover plate has centrally mounted in its a tubular post 9 coaxial with but spaced away from the shaft 2 which passes through it, and the outer end of this post is formed with a conical counterbore 10 for a purpose hereafter noted.

Within the casing formed by the members 5, 7 and 8 is mounted a relatively heavy ring 11 constituting a presser plate movably connected to the cylindrical body 7, so as to be free to slide therein, by a series of radially mounted pins 12, the adjacent faces of this presser plate and of the structure 5 being preferably plane and parallel. Between these faces extends the outer portion of a relatively flexible dished clutch disc 13 made of suitable sheet metal and fixed, as by rivets 14, to an outwardly projecting flange of a sleeve 15 slidably splined to the shaft 2. That portion of said disc which extends between the presser plate 11 and the structure 5 has facings 16 and 17 of suitable friction material such as is commonly used for brake and clutch linings. Between the presser plate 11 and the casing cover plate 8 are mounted a series of helical springs 18, each of which extends into a recess or depression of said presser plate and is engaged by a centering boss 19 pressed inwardly from the cover plate 8. When the available distance between the presser plate and the cover plate is less than in Fig. 1, as when an increased number of clutch disks is required, I may in place of the centering bosses 19, provide the cover plate with suitable holes and in these mount flanged cups 19ª for holding the springs 18 in fixed positions relatively to the presser plate and cover plate.

In the present instance there are three adjusting bolts 20 each having right and left hand threaded portions, of which one is adjustably screwed into the presser plate and the other is similarly screwed into a post 21 of hexagonal, square, or other cross sectional form besides circular. These posts extend through similarly formed holes in the cover plate 8 so as to be held thereby from rotation while being free to move longitudinally.

The bolts 20 have hexagonal or other suitable wrench-receiving portions 22 and are provided with suitable jam nuts held from rotation by washers 23 and 24, interposed between said nuts and the adjacent faces of the presser plate 11 and posts 21 respectively. These washers have tongues or extensions as shown, which may be turned at right angles to engage the structures between which they are mounted so as to prevent relative movement thereof. The posts 21 have their outer ends forked for the reception of clutch-actuating levers 25 preferably pivotally connected to them by pins 26. These levers include relatively short arms all bearing upon an adjusting ring 27 rotatably guided within and retained by the dished body portion of the cover plate 8 of the casing. The portions of the adjusting ring 27 engaged by the levers 25 are made of varying thickness, in the present instance being stepped as indicated at 28, so that rotation of the ring coaxially with the shaft 2 will permit uniform and simultaneous adjustment of said levers to compensate for wear of the coacting friction elements comprised by the presser plate, the fly wheel structure and the facings of the flexible disc 13.

In this case the long arms of the levers 25 extend toward and past the shaft 2, adjacent which their inner ends rest upon a flange 29 of a sleeve 30 slidably mounted on the tubular post 9, there being turned up tongues or extensions 31 on said flange which extend along the sides and over the tops of said levers to hold them in place. The flange 29 is placed at the inner end of the sleeve 30 and the outer end of the sleeve is outwardly flanged to retain in place a collar structure 32 providing an anti-friction bearing 33 to be engaged by the foot pedal or other controlling member whereby the sleeve 30 may be controlled or actuated.

Mounted in the outer end of said sleeve is an inwardly projecting ring 34 more or less closely fitting around the shaft 2, and in order to insure lubrication of the bearing 33, suitable openings or passages 35 are provided in the sleeve 30 whereby lubricant delivered to an axial or other passage 36 in the shaft 2 and flowing therefrom through a radial passage 37 into the space defined by the counterbore 10 of the post 9, may be delivered to said bearing. For this purpose the basal portion or part of said counterbore of maximum diameter is adjacent said openings 35.

With the above described arrangement of parts, the springs 18 act between the cover plate 8 of the casing and the presser plate 11 to cause the latter to frictionally couple the outer portions of the flexible clutch disc 13 to the fly wheel structure 5. When however it is desired to release the clutch, the sleeve 30 is moved outwardly, thus causing the levers 35 to fulcrum on the adjusting ring 27 and drawing the presser plate 11 forcibly away from the flexible clutch disc 13 against the action of the springs 18.

As indicated in Figs. 5, 6 and 9, I may if desired provide a plurality of flexible friction discs 13 and 13ª, of which the first mentioned is fixed to the flange of a sleeve 15ª slidably but non-rotatably mounted on the shaft 2. Said sleeve is externally fluted to slidably but non-rotatably receive the second sleeve 15ᵇ which has a flange fixed to the second friction disc 13ª. Both of said discs preferably have suitable friction facings 16 and 17 and between them is provided a flat metal clutch ring 40 slidably but non-rotatably held to the fly wheel casing structure 5—7 by a series of keys 41, also engaging the presser plate 11 and including integral stems 42 extending into suitable recesses in the part 7 whereby they are retained in position.

With this arrangement of parts, the two flexible clutch discs are free to move relatively to each other as well as on the shaft 2 on which they are mounted, so that they not only automatically position themselves to take up or compensate for wear which may occur, but also are free to move to completely release the casing-carried clutch elements with which they are associated, when by the action of the levers 25 the springs are compressed and the presser plate 11 is drawn away from them.

In this form of my invention, the longitudinal movement of the sleeve 30 on the tubular post 9 is limited so that when moved away from the casing, it cannot come into engagement with the transmission structure which is customarily immediately adjacent its outer end and for this purpose I provide links 43 preferably having the construction shown in Fig. 8 extending through slots in the casing cover 8 and having one end turned up as indicated at 44 to prevent their withdrawal from said slots. The bodies of said links are slidably mounted in notches 45 of the flange 29ª engaged by the levers 25 and said links have heads 46 whereby the outward movement of the sleeve 30 is restricted as desired, although said sleeve is free to move on the post 9 through sufficient range to properly actuate and control the levers 25.

The lever-adjusting ring 27 is shown with one end turned over to form a loop 48 to facilitate its rotation for purposes of adjustment and it may be rigidly and immovably clamped in any given position by setting up a nut 49 on a bolt 50 carried by the cover plate 8, there being a washer 51 on said bolt to facilitate the holding of said ring. If desired I may employ any other suitable device for retaining the ring 27 in its adjusted positions, such for example as the arrangement of parts shown in Figs. 11 and 12, wherein said ring 27<sup>b</sup> is formed with notches 61 for coaction with a retaining spring 62, radially or otherwise fixed to the cover plate 8.

Under conditions of operation oil is supplied through the passages 36 and 37 of the shaft so that it enters the conical bore 10 in the cover carried post 9. Since this is rotating, such oil is impelled under the action of centrifugal force to flow toward its portion of maximum diameter into the outer end of the sleeve 30 and thence through the openings 35 into the bearing 33 which is thus maintained in a satisfactory lubricated condition.

It will be understood that the externally mounted levers 25 and their cooperating external adjusting ring 27 may be widely varied in form and mounting from the construction shown in Fig. 1 without departing from my invention. For example, I may under certain conditions construct and arrange these elements as shown in Fig. 10, for this purpose forming the cover plate 8<sup>a</sup> with struck up or pressed out portions serving to position and guide the adjusting ring 27<sup>a</sup> inside of the posts 21 so that it engages the levers 25<sup>a</sup> between these and their inner ends, which in this case are designed to be directly engaged by a portion of the collar 32 actuated by the clutch-controlling lever or other element (not shown). Said collar with its bearing is enclosed by a housing 55, which however, may be omitted without departing from my invention.

With this arrangement of parts, the forcible movement of the collar 32 toward the clutch casing will cause the levers 25<sup>a</sup> to fulcrum on their adjusting ring 27<sup>a</sup> and thus through the posts 21, forcibly draw the presser plate 11 away from its coacting friction discs to release the clutch. When the collar 32 is permitted to move outwardly, the springs 18 act to frictionally grip the flexible disc or discs between the presser plate 11 and the fly wheel structure 5. As previously described, the adjusting ring 27<sup>a</sup> has portions of varying thickness, so that when adjusted by being rotated coaxially with the shaft 2, it will present portions of the same thickness to all of the external clutch-actuating levers, thus insuring that the presser plate is always maintained with all parts of its flat face equally spaced from the adjacent friction elements. This construction also permits adjustment of the presser plate to compensate for wear being made with the utmost accuracy and with the coacting parts of the ring and levers fully visible.

Where in Fig. 1 I have shown the right and left hand threaded bolts 20 as connecting the posts 21 with the presser plate 11, in Fig. 5 I have shown a modified form of the invention whereby I utilize bolts 20<sup>a</sup> having square or other suitably formed heads non-rotatably set in the presser plate and formed with their threaded portions screwed into the posts 21 where they are retained in fixed adjustment by jam nuts 60. This arrangement as well as that shown in Fig. 1, permits of the speedy and accurate assembly of the various parts in the shop and insures that such assembly shall remain in permanent adjustment unless the parts are disassembled.

I claim:

1. The combination in a friction clutch of a casing; coacting friction elements including a presser plate within said casing, springs for moving the presser plate to engage the friction elements; clutch controlling levers mounted outside the casing and operatively connected to the presser plate; means for actuating said levers to move the presser plate in opposition to the springs; and a fulcrum ring having portions of varying thickness coacting with the fulcrum portions of said levers to permit their uniform adjustment to compensate for wear of the coacting friction elements.

2. The combination in a friction clutch of a casing including a cover plate; coacting friction elements in said casing including a presser plate; a circumferentially adjustable ring mounted on the outside of the cover plate and having portions of varying thickness; clutch-controlling levers mounted on the outside of said cover plate and including fulcrum portions movably engaging the portions of varying thickness of said ring; means connecting the levers with the presser plate; and means for actuating the levers.

3. The combination in a friction clutch of a casing; a shaft extending into said casing; a sleeve splined to said shaft; a second sleeve mounted on said first sleeve and splined thereto; two flexible clutch discs respectively connected to said two sleeves; clutch elements connected to the casing and alternated with said discs; with means for causing said discs and clutch elements to be frictionally coupled or released at will.

4. The combination in a friction clutch of a casing; a shaft extending into said casing; a sleeve splined to said shaft; a second sleeve mounted on said first sleeve; two clutch discs respectively connected to said two sleeves; clutch elements connected to the casing and alternated with said discs; with means for causing said discs and clutch elements to be frictionally coupled or released at will, the same including controlling levers mounted on the outside of the casing; a presser plate within the casing operatively connected to the levers; and means for actuating said levers.

5. The combination in a friction clutch of a casing; coacting friction elements including a presser plate in said casing; operating levers mounted on the outside of the casing; posts extending through the casing and connected to the levers; a circumferentially adjustable fulcrum ring on the outside of said casing; threaded members adjustably connecting said posts to the presser plate; and means for actuating said clutch levers at will.

6. The combination in a friction clutch of a casing having a tubular post connected thereto; a shaft extending through said post into the casing; coacting clutch elements in the casing; means for actuating said elements including levers mounted on the outside of the casing; a sleeve slidably mounted on said tubular post for controlling the levers; and links connecting the sleeve and casing for limiting the sliding movement of the former.

7. The combination in a friction clutch of a casing; coacting friction elements in said casing; controlling levers operatively connected to one of the friction elements; means including a slidably mounted sleeve for actuating the levers; and members slidably engaging the sleeve and fixed to the casing for limiting movement of the sleeve as well as for preventing its rotation relatively to the casing.

8. The combination in a friction clutch of a casing; a cover formed to provide a circular guideway; coacting friction elements in said casing; controlling levers operatively connected to one of said elements; a ring adjustably mounted in the guideway of the cover on the outside of the casing and having portions of varying thickness engaged by the fulcrum portions of the levers respectively; with means for operating the levers.

9. The combination in a friction clutch of a casing; coacting clutch elements in the casing including a plurality of dished clutch members; a shaft extending into the casing and operatively connected to said members; a second shaft; means for rigidly connecting said second shaft to the casing including members extending into the dished portion of one of said clutch members; with means for actuating the clutch elements.

10. The combination in a friction clutch, of a casing; coacting friction elements including a presser plate in said casing; operating levers mounted on the outside of the casing; posts extending from the presser plate through the casing and adjustably connected to said levers; a circumferential fulcrum ring on the outside of said casing; and means for actuating said clutch levers at will.

POWELL EVANS.